United States Patent
Zeisler et al.

[15] 3,658,263
[45] Apr. 25, 1972

[54] CHOPPING AND SCREENING MACHINE FOR CANDY PARTICLES AND THE LIKE

[72] Inventors: Edward G. Zeisler; Glenn H. Zeisler, both of St. Louis, Mo.

[73] Assignee: St. Louis Fondant Company, St. Louis, Mo.

[22] Filed: Apr. 3, 1970

[21] Appl. No.: 25,376

[52] U.S. Cl. ..........................241/56, 241/57, 241/74, 241/79.3, 241/167
[51] Int. Cl. .................................B02c 11/08, B02c 13/13
[58] Field of Search..................241/56, 57, 69, 73, 74, 79.3, 241/167, 188 R, 60, 80, 97, 154, 166

[56] References Cited

UNITED STATES PATENTS

| | | |
|---|---|---|
| 248,122 | 10/1881 | Tustin ...............................241/166 X |
| 2,575,380 | 11/1951 | Borton.................................241/194 |
| 3,233,836 | 2/1966 | Merges..................................241/73 |
| 2,480,085 | 8/1949 | Mitchell................................241/74 |
| 2,099,133 | 11/1937 | Munro et al. .....................241/79.3 X |
| 1,451,424 | 4/1923 | Head ......................................241/56 |
| 2,016,497 | 10/1935 | Holbeck et al........................241/56 X |
| 3,235,188 | 2/1966 | Bradley..................................241/74 |
| 2,138,715 | 11/1938 | Thorsen.................................241/74 |

*Primary Examiner*—Robert L. Spruill
*Attorney*—Jerome A. Gross

[57] ABSTRACT

Candy-like ingredients, such as are used in baking and candy making, may vary from hard to mushy consistency. The present machine chops and screens them without producing undesirable fine particles. The product is introduced to rotating screened cage at one end. The cage is driven at the opposite end through a tubular drive, with a concentric contra-rotating bladed cutter shaft, the cage being surrounded by an upper casing terminating in discharge chutes, and its screen perforations being cleaned by a rotatable brush which rests on the cage within the top of the casing. A suction fan at the concentric drive end of the cage avoids outflow of chopped particles which might clog the drive mechanism.

2 Claims, 5 Drawing Figures

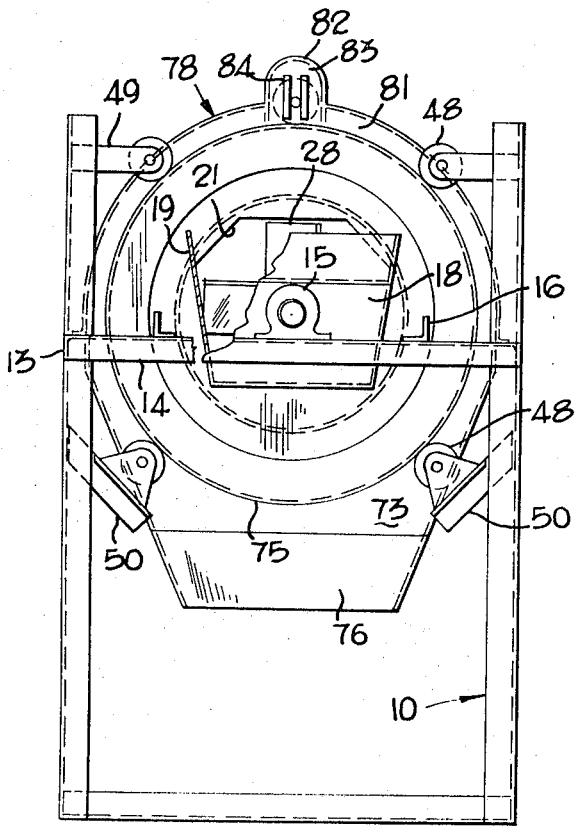
FIG. 2
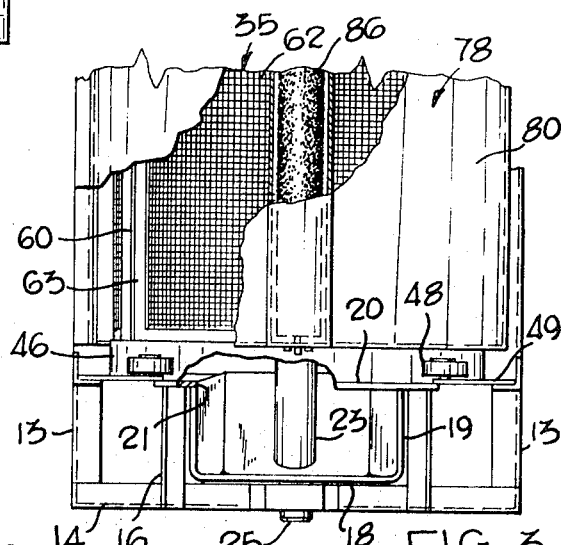
FIG. 3
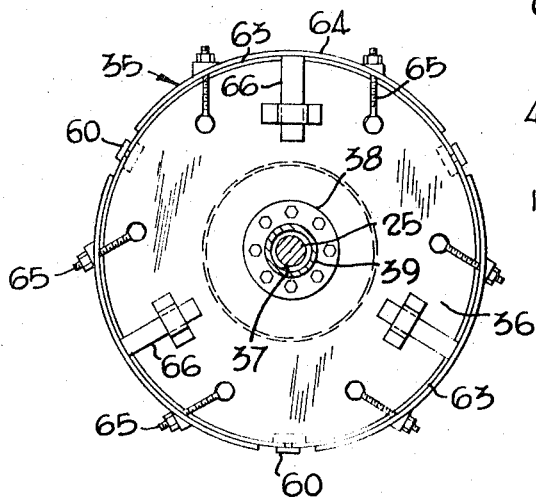
FIG. 5
FIG. 4
Inventors
EDWARD G. ZEISLER
GLENN H. ZEISLER
By
Attorney

CHOPPING AND SCREENING MACHINE FOR CANDY PARTICLES AND THE LIKE

BACKGROUND OF THE INVENTION

This invention relates to machines for chopping and screening, and particularly is applicable to the chopping and screening of candy particles whose consistency may vary from hard to soft and coherent.

Machines such as hammermills and mullers are not suited for handling candy particles of such varying consistency. If the particles are extremely hard and brittle, for example, an excessive amount of fine waste particles would be produced; whereas if coherent or mushy, the particles would not be separated and sized.

SUMMARY OF THE INVENTION

In the present invention, as will be clear from the detailed description of the preferred embodiments, a cage, mounted for rotation on a nearly horizontal axis, has a circumferential screen-like surface. The cage is supported at one end by a circular track, with roller means which align it on the axis of rotation; and the product to be chopped is introduced through this end. At its other end the cage is mounted on a tubular shaft, to rotate slowly in one sense.

Extending through the tubular shaft of the cage and rotated in the opposite sense at a substantially higher speed, is a cutter shaft with radially extending blades, whose tips are spaced well inward of the screen surface of the cage. Projecting inward from this surface, in the space so provided, the cage has longitudinally extending lifter means; they lift the product to a level above the cutter shaft and discharge it onto the rapidly rotating cutter blades.

On top of the rotating cage rests a brush, rotated by the cage to clean the screen perforations. Surrounding the cage spacedly are an imperforate upper casing and a lower casing and discharge guide, which collect and discharge the screened product downwardly.

Clogging of the concentric drives of the shaft and cage, which might result from the presence of small particles of the chopped product, is prevented by a centrifugal impeller mounted on the rapidly rotating cutter shaft, which draws air inward through the tubular drive shaft of the cage and discharges it radially into the cage.

BRIEF DESCRIPTION OF THE DRAWINGS

FIG. 2 is a left end view of FIG. 1.

FIG. 3 is a fragmentary plan view, partly broken away, of the left end of FIG. 1.

FIG. 4 is a sectional view taken along line 4-4 of FIG. 1.

FIG. 5 is a right end view of the rotatable cage, as seen along line 5-5 of FIG. 1 with upper and lower casing portions omitted.

DESCRIPTION OF THE PREFERRED EMBODIMENT

Figure 1:
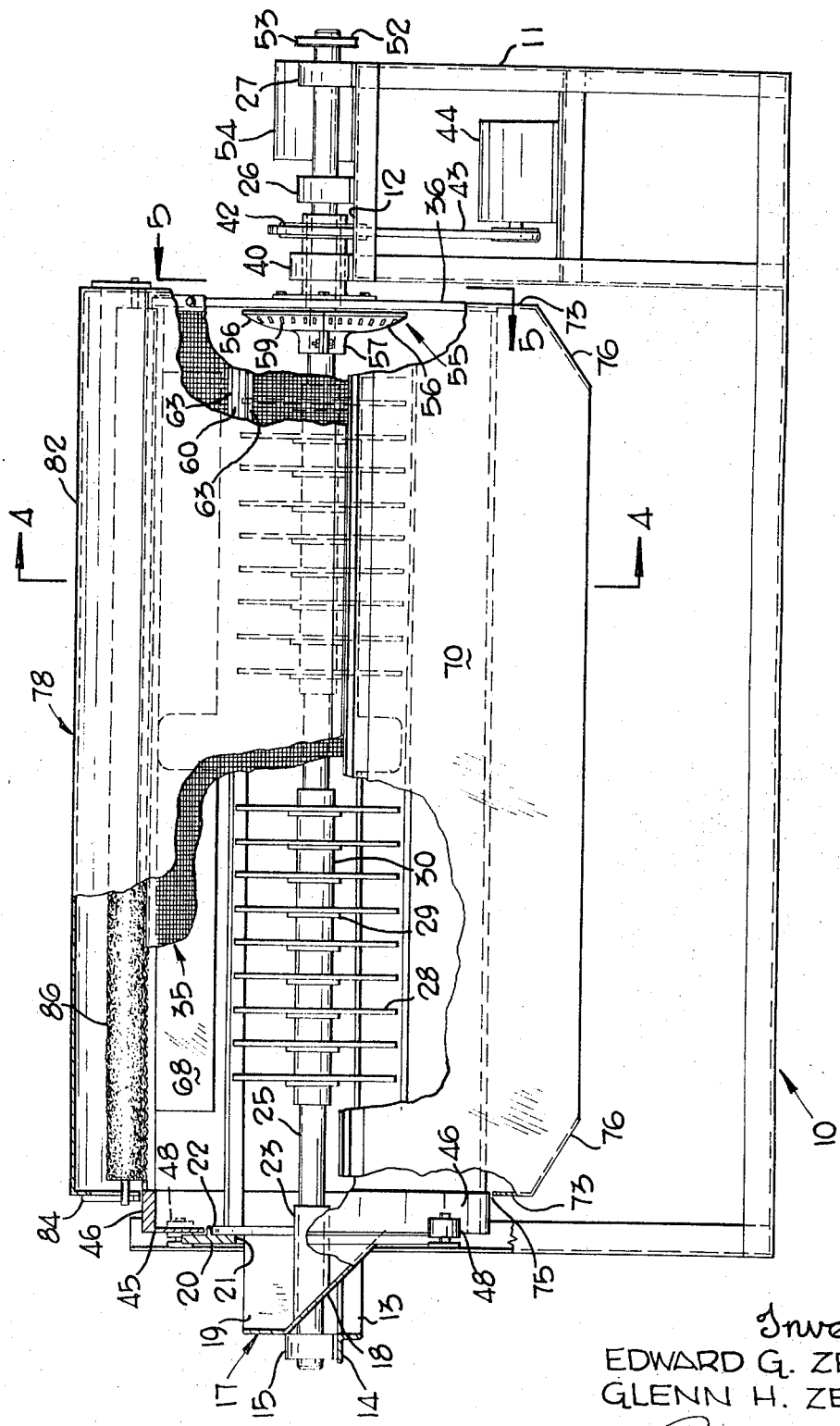
FIG. 1 is a side view, partly in elevation and partly broken away, showing a chopping and screening machine embodying the present invention.

In order to mount and align the machine elements hereafter to be described, the present invention utilizes a rigid steel frame generally designated 10, shown in FIGS. 1 and 2, welded of angle iron or other common structural elements. Viewing the machine from the side, as seen in FIG. 1, the frame 10 is rectangular, and includes, at the right end shown in that figure, drive platform structure 11 terminating upwardly in a drive platform top surface 12. On the drive platform structure 11 are supported the right ends of the rotating machine elements, hereafter to be described, and their power drives.

The left end of the frame structure is shown in FIG. 2. Horizontal stub beams 13 extend to a transverse support member 14, providing end-support structure which is U-shaped when viewed from above as in FIG. 4, at a height corresponding substantially to that of the drive platform surface 12. It serves as the principal support for a heavy pillow block 15 and for feed hopper structure generally designated 17, hereafter described, which as seen in FIG. 1, extends to the left from a vertical, somewhat washer-like feed hopper plate 20. A pair of short longitudinal support angles 16, seen in FIG. 2, extend from the transverse support member 14 to the feed hopper plate 20, parallel to each other on the opposite sides of the pillow block 15.

The hopper 17 includes a downward and inward slanting plate 18 which continues through a feed cut-out 21 in the hopper plate 20, and side plates 19 which extend to the vertical hopper plate 20.

The feed cut-out 21 is shaped substantially to follow the outline of the hopper 17 as seen in FIG. 2. Along the inner surface of the hopper plate is an inward projecting circular flange 22 which surrounds the feed cut-out 21.

Welded to the slanting end plate 18 is an inward-extending tubular sleeve 23; the slanting plate 18 is cut out within the sleeve 23 to permit passage of a cutter shaft 25. The cutter shaft 25 extends the entire length of the machine, as seen in FIG. 1. Its left end is supported in the pillow block 15. At and adjacent to its right end, the shaft 25 is supported by a pair of pillow blocks 26, 27 mounted on the drive platform surface 12. The shaft 25 is not horizontal; it slopes slightly from the pillow block 15 at its left end to the right end pillow blocks 26, 27.

Secured on and perpendicular to the cutter shaft 25 are a plurality of pairs of crossed cutter blades 28, 29 best shown in FIG. 3. Each pair of blades 28, 29 is spaced apart from the adjacent pairs by spacing collars 30. The blades 28, 29 have square-cut tips 31 and knife-like sharpened edges 32. The blades 28, 29 do not extend continuously along the shaft 25. Instead, a first group of said blades is positioned on the shaft 25 commencing spacedly inward of the sleeve 22 and extending to near the mid-length of the shaft; and the second, equal group of blades 28, 29 is spaced to the right thereof, as seen in FIG. 1.

Surrounding the bladed portion of the shaft 25, and extending from a point closely adjacent to the feed hopper plate 20 to near the drive platform 12, is a cage generally designated 35. At its right end, the cage 35 has a disk-like solid end plate 36 with a central bore 37. About the bore 37, a mounting flange 38 mounts a tubular stub shaft 39 which is supported, within a large pillow block 40 mounted on the platform 12, so as to be concentrically outward of the cutter shaft 25. Slow rotation, in the sense shown by the outer arrow in FIG. 4, is imparted to the tubular stub shaft 39 by a sheave 42 through a belt 43 powered by an electrical motor 44.

At the left end of FIG. 1, mounted with clearance about the flange 22 of the feed hopper plate 20, the cage 35 has a heavy annular track plate 45 whose outer circular flange 46 is supported and aligned for rotation by rollers 48, best shown in FIG. 3. The rollers 48 are mounted for rotation along longitudinal axes by upper and lower roller brackers 49, 50 welded to upright members of the frame 10. The rollers 48 thus define a path of rotation for the cage track 46 about the axis of the cutter shaft 25, which, however, rotates in the opposite direction, as shown by the inner arrow of FIG. 4. Power for so rotating the cutter shaft 25 is applied to its right end by means of an attached sheave 52, through a driving belt 53 driven by a second electrical motor 54, mounted on the platform surface 12 as shown in FIG. 1.

Mounted on the cutter shaft 25 at a small spacing inward of the end plate 36 is a centrifugal impeller generally designated 55. It has a saucer-shaped housing consisting of two housing pieces 56 each of 180° angular extent, bolted together at their hub portions 57. Within the saucer-like housing pieces 56 are a plurality of impeller blades 59. Thus, the impeller 55 serves as a means to draw air through the annular space between the cutter shaft 25 and the stub shaft 39 concentrically outward of it, and discharge it radially into the cage, passing through the space inward of the plate 36.

Reverting to the construction of the cage 35, extending between the end plates 46, 36 are three longitudinal I-shaped screen edge support rods 60 and, alternating between them, three rectangular intermediate support rods 61, best seen in FIG. 4. They support the circumferential surface of the cage 35, which consists of three screens 62, each of 120° extent as shown in FIG. 4. The frame edges 63 of the screens 62 fit within the side indentations of the I-shaped rods 60 sliding in from the right end above the end plate 36. At the right end plate 36, fitting over the screen frames 63, are rigid 120° arcuate screen supports 64. They are secured to the end plate by conveniently releasable means, including bolted connectors 65 and slide guides 66.

The size of the openings in the screens 62 is the size desired for chopped particles of the product to be processed by the machine. Instead of screens, the outer surfaces of the cage may be formed of other material, for example sheet metal perforated by screen-like perforations.

Secured, as by welding, to the three intermediate longitudinal rods 61 are elongated rectangular lifter plates 68, best shown in FIGS. 1 and 4. As seen in FIG. 4, they are so welded to the rods 61 as to project inward a radial extent somewhat short of the outward radial extent of the cutter blades 28, 29. The lifter plates 68 extend longitudinally substantially the entire length of the cage 35, although, as shown in FIG. 1, it is preferred to utilize two equal, nearly contiguous plates 68 on each of the rods 61 with small spacings between them and at their ends. Means are provided to house the lower half of the cage 35 and guide the discharge from the cage downward. In the embodiment shown, these means include inward sloping sheet metal lower housing sides 70 supported at their upper extremities by exterior longitudinal angles 71 extending, at about the level of the cutter shaft 25, between left and right end housing plates 73. Top arcuate cut-outs 75 in the housing end plates 73 fit closely adjacent to the cage ends 45, 36, and lead to inward sloping guide chute walls 76 which join the plates 70, thus forming an open bottom for the lower housing means.

Securable to the exterior longitudinal angles 71 of the lower housing sides 70 is an imperforate upper casing generally designated 78. As shown in FIG. 4, the lower edges of the casing 78 are exterior edge angles 79 which may rest upon and be secured to the angles 71. Rising between the exterior edge angles 79 is a semi-cylindrical casing wall 80, shown partly broken away in FIGS. 1 and 3. At its left and right ends are 180° arcuate end closure ribs 81, whose lower ends abut against the upper ends of the baffle plates 73, 74.

Inserted longitudinally along the top center of the semi-cylindrical wall 80 is an inverted U-shaped sheet metal brush housing 82 whose end walls 83 are extensions of the ribs 81. They are vertically slotted and hold vertical slide brackets 84, which mount the ends of a longitudinal shaft 85 of a brush 86 which extends substantially the entire screened length of the cage 35. The brush 86 is bristled; the slide brackets 84 serve as vertically slidable fittings which permit the brush 86 to position itself, above the axis of rotation of the cage 35, at a level established by how deeply its bristles enter the screens 62 under the weight of the brush 86. As the cage 35 rotates, the brush 86 penetrates the screen perforations to keep them clean and unclogged by the product being chopped and screened.

The product to be chopped, for example, cooked or baked masses of candy, is introduced into the top opening of the feed hopper 17. It slides downward and inward along the plate 18, passing over the tubular sleeve 23 which protects the cutter shaft 25 and through the hopper plate opening 21, to fall onto the lower screen 62 at its left end. Turned by its hollow stub shaft 39, the cage 35 is rotated slowly in the sense of rotation shown by the outer arrow in FIG. 4. Were it not for the lifter plates 68, the product to be chopped would tend to remain in the bottom of the cage 35, sliding downward as the screened bottom rose sideward and upward. However, the lifter plates 68 lift the product as the cage rotates to a level above center, after which the product is discharged downwardly, falling onto and about the blades 28, 29. Since the blades 28, 29 rotate with the cutter shaft 25 at a much higher rate of speed than the cage 35, and in the opposite sense of rotation, the product so discharged onto the blades 28, 29 is struck by them with great force, chopping them into small particles. The impact of the rotating blades 28, 29 drives the product so chopped radially in all directions. The chopped particles which are small enough to penetrate the screens 62 will pass through them, to be collected beneath the upper casing 78 and discharged downward between the housing side plates 70. Such discharged particles may be collected in receptacles or on other screens beneath the machine.

As will be obvious, some of the particles discharged from the lifter plates 68 will pass between the adjacent pairs of blades 28, 29 without being chopped; and some chopped particles may be too large to pass through the screens 62. These will rest on the bottom of the cage 35 until lifted by the next passing lifter plate 68, again to be discharged over and onto the rapidly rotating blades 28, 29. Due to the downward inclination of the cage axis of rotation each time particles fall to the bottom of the cage 35 they will move farther to the right. The length of the cage 35, the spacings of the pairs of blades 28, 29 from each other, and the downward angle of the cutter shaft 25 are so adjusted that substantially the entire length of the cage 35 and the entire bladed portions of the cutter shaft 25 will be utilized in the chopping and screening process.

By rotating the cage 35 and cutter shaft 25 in opposite senses, the difference in their speeds is accentuated; and particles, driven by the impact of the blades 28, 29, pass more directly through the openings in the screens 62.

If portions of the candy or other product are chopped too firmly, these must be rejected. To function with a minimum of rejected fine particles, it is important that once small enough to pass through the screens 62, particles should not be subjected to further chopping action. For this reason, a short portion of the cutter shaft 25 immediately inward of the left cage end plate 46, as well as the lifter plates 68, are spaced away from that end. Thus, particles of product which, when introduced into the hopper 17, are already small enough to pass through the screens 62, may do so before moving longitudinally to the point of being lifted by the plates 68 for discharge onto the blades 28, 29. A second unbladed space is left along the cutter shaft 25 at substantially mid length, to assure passage through the screen 62 of particles which at that stage have been reduced to the desired size.

In other types of machines, for example hammermills, grinders and mullers, if sticky or ductile candy or other material was introduced, it could not be reduced to desired size, but would clog the machine. The present construction obviates this problem.

The function performed by the centrifugal impeller 55 is this: fine particles of sticky material might clog even the simple concentric drive mechanism; therefore such particles should not permitted to pass outward through the concentric drives of the cutter shaft 25 and hollow stub shaft 39 of the cage 35. The centrifugal impeller 55, rapidly rotating with the cutter shaft 25, creates an inflow of air through the annular space inwardly of the stub shaft 39. This inflow of air makes it impossible for chopped particles to pass outward; thus the motors 44, pillow blocks 26, 27, 40, and other mechanisms (such as geared speed reducers) which may be mounted on the drive platform structure 11, remain substantially clean.

We claim:
1. For reducing material into small particles, a machine characterized by a non-clogging, counter-rotating drive, said machine being of the type including
    a rotating screen cage having a longitudinal axis of rotation,
    means including a shaft counter-rotating within the cage to reduce material to small particles,
    means at one end of said longitudinal axis to introduce material into the cage, means at the other end to support the cage for rotation on said axis, and means at said other end to support the shaft for counter-rotation on said axis, characterized in that the cage has an opposite end and has thereat hollow tubular support and drive means, and the shaft extends therethrough and therebeyond to shaft support and drive means, and the outer diameter of the shaft, so extending through the hollow tubular drive means, is less than the inner diameter thereof, whereby to provide a ventilation space, and the shaft has, immediately inward of said tubular drive means at said cage end, fan means to provide air inflow through such space, whereby the inflow of air through into the cage, at its end opposite to that at which material is introduced, prevents small particles of material from passing from the cage through the tubular drive means and clogging the drives of the cage and shaft.

2. A chopping and screening machine, comprising a frame, a cage mounted thereon for rotation about a longitudinal, somewhat downward sloping axis, and having a cage inlet at an end corresponding with the upper end of said axis, a circumferential cage surface including screen-like perforations, longitudinally extending lifter means projecting inwardly from said surface, means to rotate the cage about the axis, an imperforate upper housing spacedly surrounding the upper part of the cage, and lower housing and discharge means extending downwardly therefrom, together with a cutter shaft extending substantially axially within the cage and having cutter blades extending radially outward and terminating short of the inward projecting lifter means, and means to rotate the cutter shaft at a substantially higher angular speed than that of the cage and in the opposite sense of rotation, the blades being arranged in a spaced progression along said shaft which progression is interrupted intermediate its ends by an unbladed shaft portion whose length substantially exceeds the inter-blade spacing of said progression, whereby to permit particles small enough to pass through the cage surface to be screened out without being subject to further cutting action.

* * * * *